United States Patent
Subrahmanyam et al.

(10) Patent No.: US 10,846,280 B2
(45) Date of Patent: *Nov. 24, 2020

(54) COMMIT COALESCING FOR MICRO-JOURNAL BASED TRANSACTION LOGGING

(71) Applicant: VMware, Inc., Palo Alto, CA (US)

(72) Inventors: Pratap Subrahmanyam, Saratoga, CA (US); Zongwei Zhou, Mountain View, CA (US); Xavier Deguillard, Orsay (FR); Rajesh Venkatasubramanian, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/560,951

(22) Filed: Sep. 4, 2019

(65) Prior Publication Data
US 2020/0004735 A1  Jan. 2, 2020

Related U.S. Application Data

(63) Continuation of application No. 15/192,937, filed on Jun. 24, 2016, now Pat. No. 10,445,308.

(60) Provisional application No. 62/343,423, filed on May 31, 2016.

(51) Int. Cl.
*G06F 16/30* (2019.01)
*G06F 16/23* (2019.01)

(52) U.S. Cl.
CPC ...... *G06F 16/2343* (2019.01); *G06F 16/2358* (2019.01); *G06F 16/2379* (2019.01)

(58) Field of Classification Search
CPC .................. G06F 11/1474; G06F 16/2379
See application file for complete search history.

(56) References Cited

U.S. PATENT DOCUMENTS

| 10,169,169 | B1 | 1/2019 | Shaikh et al. |
| 2009/0089338 | A1 | 4/2009 | Ranade et al. |
| 2010/0274768 | A1 | 10/2010 | Wang et al. |

(Continued)

OTHER PUBLICATIONS

Jian Xu et al, "NOVA: a Log-structured File System for Hybrid Volatile/Non-volatile Main Memories", Feb. 22, 2016, 17 pages, Santa Clara, CA.

*Primary Examiner* — Mahesh H Dwivedi

(57) ABSTRACT

Techniques for using commit coalescing when performing micro-journal-based transaction logging are provided. In one embodiment a computer system can maintain, in a volatile memory, a globally ascending identifier, a first list of free micro-journals, and a second list of in-flight micro-journals. The computer system can further receive a transaction comprising a plurality of modifications to data or metadata stored in the byte-addressable persistent memory, select a micro-journal from the first list, obtain a lock on the globally ascending identifier, write a current value of the globally ascending identifier as a journal commit identifier into a header of the micro-journal, and write journal entries into the micro-journal corresponding to the plurality of modifications included in the transaction. The computer system can then commit the micro-journal to the byte-addressable persistent memory, increment the current value of the globally ascending identifier, and release the lock.

21 Claims, 7 Drawing Sheets

(56) References Cited

U.S. PATENT DOCUMENTS

| | | |
|---|---|---|
| 2013/0110774 A1* | 5/2013 | Shah .................. G06F 11/1658 |
| | | 707/610 |
| 2014/0244581 A1* | 8/2014 | Rath .................... G06F 16/273 |
| | | 707/623 |
| 2014/0258671 A1 | 9/2014 | Lord |
| 2014/0379638 A1 | 12/2014 | Li et al. |
| 2015/0193464 A1 | 7/2015 | Kwon et al. |
| 2015/0261808 A1* | 9/2015 | Zhou .................. G06F 16/2343 |
| | | 707/703 |
| 2016/0344834 A1 | 11/2016 | Das |
| 2017/0011062 A1 | 1/2017 | Zaveri et al. |
| 2017/0344595 A1 | 11/2017 | Subrahmanyam et al. |

\* cited by examiner

COMMIT COALESCING FOR MICRO-JOURNAL BASED TRANSACTION LOGGING

CROSS-REFERENCE TO RELATED APPLICATIONS

This application is a continuation of U.S. application Ser. No. 15/192,937, filed Jun. 24, 2016, now U.S. Pat. No. 10,445,308, issued Oct. 15, 2019, entitled "Commit Coalescing for Micro-Journal Based Transaction Logging," which claims priority to U.S. Provisional Patent Application No. 62/343,423, filed May 31, 2016, entitled "Commit Coalescing for Micro-Journal Based Transaction Logging," which is incorporated by reference in their entireties for all purposes.

BACKGROUND

Applications that rely on transactional semantics, such as databases, key-value stores, file systems, and the like, typically make use of transaction logging (also known as journaling) to ensure data consistency in the face of system crashes/failures. In a conventional transaction logging implementation, an application records all of its transactions in a singular write-ahead/append-only log that is stored on nonvolatile storage (e.g., a magnetic hard disk or solid-state disk (SSD)). The "append-only" qualifier means that log entries are continually added to the end of the log as transactions occur. Thus, the log captures the entire history of transactions that have been processed by the application since the last log initialization or compaction. If the application's host system crashes or otherwise fails, the entries in the log are replayed, from first to last, to bring the storage or memory on which the application data resides into a transactionally consistent state (note that some applications, such as log structured file systems, can use the log for storing its data/metadata and thus do not need to implement a replay mechanism).

While the approach of using a singular write-ahead/append-only log for transaction logging is functional (and is suited to the performance characteristics of conventional nonvolatile storage devices), it also suffers from a number of drawbacks. First, as indicated above, recovery after a system crash or failure generally requires the entirety of the log to be replayed (due to batching of log entry and/or application data commits). This can make the recovery process a time-consuming task, particularly for applications that deal with very large data volumes. Second, since the log is append-only and will continue to grow in size as new transactions are processed, there is a need to compact the log on a periodic basis so that it does not consume all of the available space on nonvolatile storage. Although there are various methods to perform this compaction, all of these methods consume CPU/memory resources and incur throughput/latency degradation, resulting in unpredictable and non-uniform performance. Third, the fact that all transactions are recorded in a single sequential log means that one malformed or buggy transaction can potentially corrupt the log entries for other transactions, thereby damaging the entire transactional history of the system.

SUMMARY

Techniques for using commit coalescing when performing micro-journal-based transaction logging are provided. In one embodiment a computer system can maintain, in a volatile memory, a globally ascending identifier, a first list of free micro-journals, and a second list of in-flight micro-journals. The computer system can further receive a transaction comprising a plurality of modifications to data or metadata stored in the byte-addressable persistent memory, select a micro-journal from the first list, obtain a lock on the globally ascending identifier, write a current value of the globally ascending identifier as a journal commit identifier into a header of the micro-journal, and write journal entries into the micro-journal corresponding to the plurality of modifications included in the transaction. The computer system can then commit the micro-journal to the byte-addressable persistent memory, increment the current value of the globally ascending identifier, and release the lock.

The following detailed description and accompanying drawings provide a better understanding of the nature and advantages of particular embodiments.

DETAILED DESCRIPTION

Figure 1:
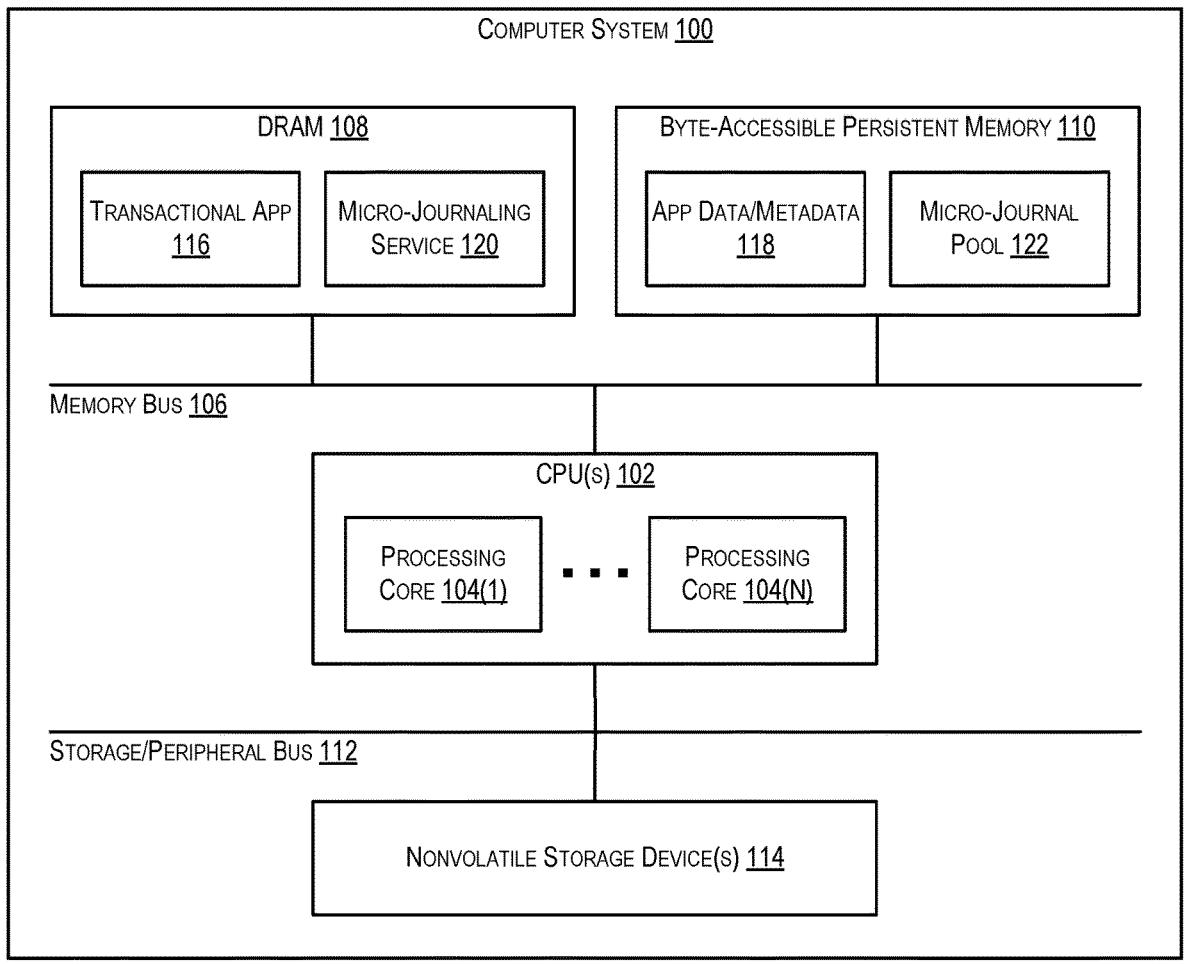
FIG. 1 depicts a computer system in which embodiments of the present disclosure may be implemented.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide enhanced transaction logging techniques that make use of a pool of micro-journals, rather than a singular write-ahead/append-only log, to ensure crash consistency for a transactional application. As used herein, a "micro-journal" is a relatively small, fixed-size log (e.g., on the order of bytes, kilobytes, or megabytes depending on application data volume) that records journal entries for a single transaction at a time.

These micro-journaling techniques are particularly well-suited for implementation on computer systems that incorporate byte-addressable persistent memory, which offers fast, fine-grained access to data in a manner similar to dynamic random-access memory (DRAM) but is nonvolatile in nature. Accordingly, all of the embodiments described herein assume that the micro-journals are stored on such byte-addressable persistent memory. Examples of existing byte-addressable persistent memory technologies include phase change memory (PCM), nonvolatile DIMMs (NVDIMMs), and so on. However, it should be appreciated that the micro-journaling techniques of the present disclosure may also be implemented using any other type of memory or storage technology (either known now or developed in the future) that exhibits similar performance, access, and durability characteristics as byte-addressable persistent memory.

According to one set of embodiments, a micro-journaling service running on a computer system can receive a transaction that includes modifications to the data and/or metadata of a transactional application. The micro-journaling service can then select a free micro-journal from a pool of micro-journals allocated on a byte-addressable persistent memory of the computer system and can write, for each data/metadata modification of the transaction, a corresponding journal entry into the selected micro-journal. Unlike a conventional write-ahead/append-only log, the selected micro-journal is dedicated to recording the data/metadata modifications made by this single transaction. Upon issuing the journal entry writes, the micro-journaling service can commit the writes to the byte-addressable persistent memory and can thereafter replay the journal entries to modify the application data/metadata "in place" (i.e., on the memory or storage medium where that data/metadata resides). Finally, the micro-journaling service can commit the data/metadata modifications and free the micro-journal for use with a subsequent transaction.

With the micro-journaling workflow above, a number of advantages can be realized over conventional transaction logging techniques that use a singular write-ahead/append-only log. For example, at the time of recovering from a system crash/failure, there is no need to replay the journal entries for all historical transactions executed by the application. Instead, the micro-journaling service need only replay the few "in-flight" micro-journals that have committed journal entries in the byte-addressable persistent memory but have not yet been marked as freed. This significantly reduces the amount of time and compute resources needed to carry out the recovery process.

Further, since each micro-journal is freed upon completion of its corresponding transaction, there is no need to implement any log compaction routines. Instead, the freed micro-journals can simply be reused for subsequent transactions.

Yet further, since each micro-journal is dedicated to recording the data/metadata modifications for a single transaction, the journal entries for different transactions are separated. This dramatically reduces the possibility of system-wide journal corruption in comparison to a consolidated append-only log.

Yet further, by storing the micro-journals on byte-addressable persistent memory (rather than conventional nonvolatile storage), the techniques of the present disclosure can take full advantage of the fast random read/write speeds of this type of memory and can avoid the long latency that is incurred by writing journal entries to disk.

In certain embodiments, in addition to storing the micro-journals in byte-addressable persistent memory, the data/metadata of the transactional application may also be persisted in, and directly manipulated from, that same memory. This may be useful for applications such as databases and key-value stores that require high throughput and low latency, but at the same time need to ensure durability of its data/metadata. In these embodiments, the micro-journaling workflow described above can be optimized to reduce the number of persistent memory commits needed to complete each transaction. This optimization, referred to as "commit coalescing," is detailed in Section (5) below.

2. System Architecture

FIG. 1 is a simplified block diagram of a computer system 100 that may be used to implement embodiments of the present disclosure. As shown, computer system 100 includes one or more central processing units (CPUs) 102 that comprise a number of processing cores 104(1)-104(N). CPU(s) 102 are connected, via a memory bus 106, to DRAM 108 and byte-addressable persistent memory (e.g., PCM, NVDIMM, etc.) 110. In addition, CPU(s) 102 are connected, via a storage or peripheral bus 112, to one or more nonvolatile storage devices (e.g., magnetic hard disks or SSDs) 114.

CPU(s) 102 are configured to execute a transactional application 116, which is shown as running from DRAM 108. Transactional application 116 is a software component that operates on data and metadata using logical units of processing known as transactions. Examples of transactional applications include, e.g., databases, key-value stores, file systems, and the like. In the example of FIG. 1, the data/metadata of transactional application 116 (i.e., app data/metadata 118) is shown as residing in byte-addressable persistent memory 110. However, in alternative embodiments, some or all of app data/metadata 118 may reside in other memory or storage locations, such as in DRAM 108 or on nonvolatile storage device(s) 114.

As noted in the Background section, conventional techniques for implementing transaction logging with respect to a transactional application like application 116 involve persisting transaction information in a singular write-ahead/append-only log that resides on nonvolatile storage (e.g., device(s) 114). However, this conventional approach suffers from a number of limitations and drawbacks, such as a lengthy recovery workflow, the need to perform log compaction, and the possibility of log corruption due to malformed/buggy transactions.

To address these and other issues, computer system 100 of FIG. 1 implements a micro-journaling service 120 (shown as running from DRAM 108) and a pool of micro-journals 122 allocated in byte-addressable persistent memory 110. Each micro-journal is a relative small, fixed-size log that is configured to store the data/metadata modifications for a single transaction. In a particular embodiment, there may be one micro-journal allocated in pool 122 for each processing core 104(1)-104(N), since each processing core can process one transaction at a time. Further, there may be N instances of micro-journaling service 120 running concurrently (one each processing core 104(1)-104(N)).

At a high level, micro-journaling service 120 can, at a time transactional application 116 is tasked with processing a transaction, carry out a workflow for writing/persisting journal entries for the transaction to an available micro-journal in pool 122, updating/persisting the application data/metadata modified by the transaction in place, and then freeing the micro-journal upon transaction completion (thereby allowing it to be reused for subsequent transactions). In addition, upon a system crash or failure, micro-journaling service 120 can identify the micro-journals that were in-flight at the time of the crash/failure and replay the journal entries in the identified micro-journals. With this general design and approach, the drawbacks associated with a singular write-ahead/append-only log are eliminated because: (1) system recovery is near instant (due to the need to replay only a few in-flight micro-journals), (2) log compaction routines are no longer necessary, and (3) log corruption is much less likely (due to the separation of transactions into separate micro-journals). Further, by placing the micro-journals in byte-addressable persistent memory 110 rather than on nonvolatile storage device(s) 114, the high latency incurred by performing journal writes/commits to disk is avoided. A more detailed description of the workflows that may be executed by micro-journaling service 120 is provided in the sections that follow.

It should be appreciated that computer system 100 of FIG. 1 is illustrative and not intended to limit embodiments of the present disclosure. For example, although micro-journaling service 120 is shown as being separate from transactional application 116, in some embodiments this service may be incorporated into application 116. Further, the various components of computer system 100 may be arranged according to different configurations, may include subcomponents and/or functions that are not specifically described, and/or may have certain components removed. One of ordinary skill in the art will recognize many variations, modifications, and alternatives.

3. Transaction Processing

Figure 2:
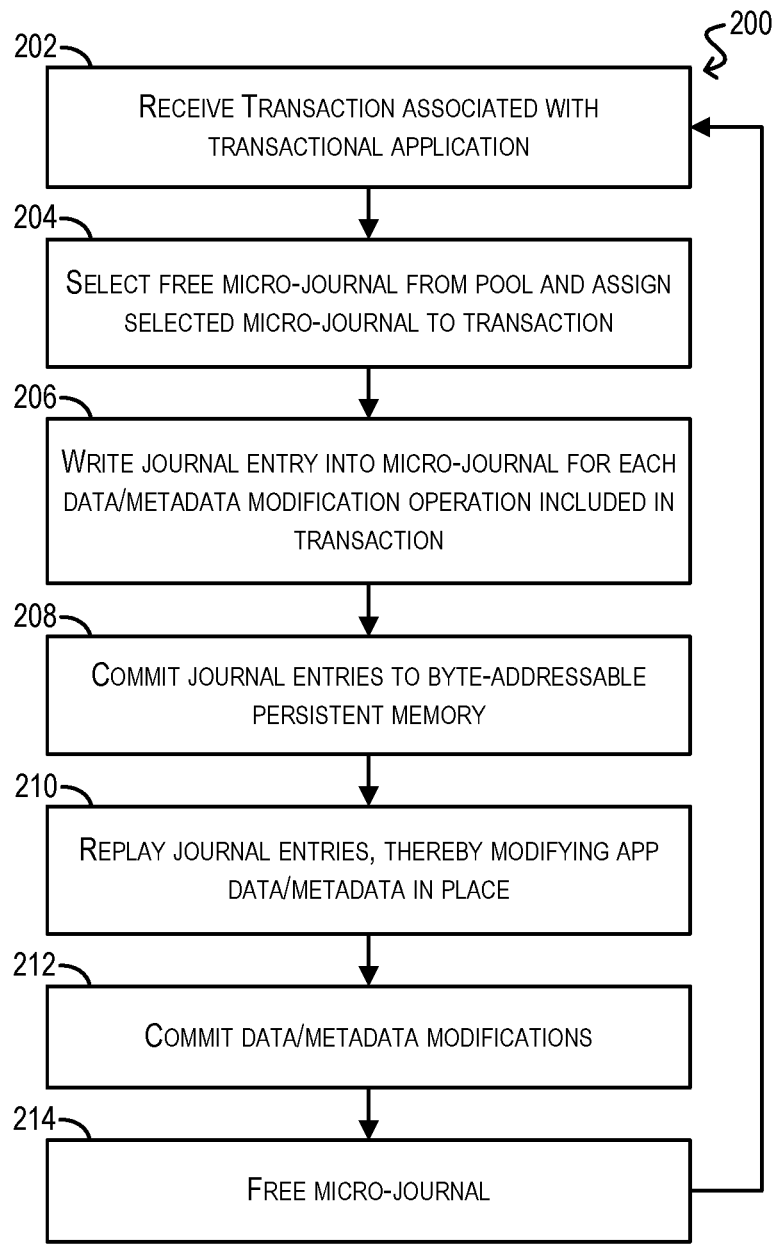
FIG. 2 depicts a micro-journal based transaction processing workflow according to an embodiment.

FIG. 2 depicts a workflow 200 that can be carried out by micro-journaling service 120 of FIG. 1 for processing a transaction according to an embodiment. It is assumed that workflow 200 is executed on a processing core 104 that is configured to run an instance of service 120.

Starting with block 202, micro-journaling service 120 can receive a transaction associated with transactional application 116. The transaction can comprise a group of modification operations 1-$m$ for modifying data and/or metadata of the application (i.e., app data/metadata 118). For example, if transactional application 116 is a key-value store, the transaction may comprise a group of modification operations for modifying a set of key-value pairs.

At block 204, micro-journaling service 120 can select, from pool 122, an available (i.e., free) micro-journal and assign the selected micro-journal to the current transaction. This can involve, e.g., placing a lock on the selected micro-journal so that it cannot be selected/assigned by other instances of service 120 for the duration of the current transaction. In one set of embodiments, the micro-journals in pool 122 can be pre-allocated at initialization of transactional application 116 or computer system 100. In other embodiments, the micro-journals in pool 122 can be allocated on an as-needed basis (e.g., at the time a micro-journal needs to be assigned to a transaction). The allocated size of each micro-journal can be fixed based on, e.g., a maximum transaction size that is expected by transactional application 116.

Once a free micro-journal has been assigned to the transaction, micro-journaling service 120 can write a journal entry into the micro-journal for each modification operation 1-$m$ included in the transaction (block 206). The specific content and format of these journal entries can vary depending on the nature of transactional application 116. Generally speaking, each journal entry will be structured such that it can be replayed multiple times without changing the end result of the modification operation (i.e., each journal entry will be idempotent). This property can be enforced by, e.g., using absolute rather than delta values for data values identified in the journal entry.

Then, at block 208, micro-journaling service 120 can commit the written journal entries to byte-addressable persistent memory 110 (referred to herein as performing a "pcommit"). This pcommit action can flush the data associated with the written journal entries from any CPU or other intermediary caches in the system and can ensure that the journal entries are, in fact, persisted to memory 110.

Upon completion of the pcommit, micro-journaling service 120 can proceed to "replay" the journal entries in the transaction (i.e., execute the modification operation corresponding to each journal entry), thereby modifying the application data/metadata in the location where it is stored (block 210). Micro-journaling service 120 can then perform a commit action to ensure that those data/metadata updates are, in fact, persisted in place (block 212). In scenarios where the application data/metadata is stored on byte-addressable persistent memory 110 (as shown in FIG. 1), this step can involve performing a second pcommit.

Finally, at block 214, micro-journaling service 120 can free the micro-journal so that it can be reused. For example, if micro-journaling service 120 previously placed on a lock on the micro-journal, that lock can be removed. Alternatively, micro-journaling service 120 can update a value in the header of the micro-journal indicating its availability status (in certain embodiments, this can be performed prior to block 212 so that it is persisted to memory 110 via the pcommit action at block 212).

Further, as part of block 214, micro-journaling service 120 can take steps to ensure that the current journal entries are overwritten for the next transaction. For instance, micro-journaling service 120 may mark the existing entries as deleted, or simply move a write pointer for the micro-journal back to the start of its allocated memory region. At the conclusion of block 214, micro-journaling service 120 can return to block 202 in order to process subsequent transactions.

4. Recovery

Figure 3:
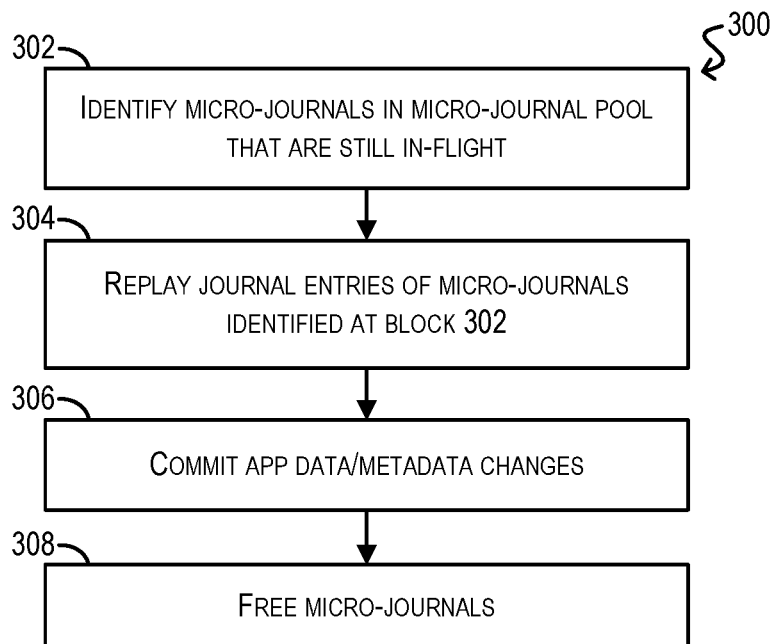
FIG. 3 depicts a recovery workflow associated with the workflow of FIG. 2 according to an embodiment.

FIG. 3 depicts a workflow 300 that may be carried out by micro-journaling service 120 of FIG. 1 for ensuring consistency of the data/metadata of transactional application 116 upon recovering from a system crash or failure according to an embodiment. Workflow 300 assumes that the transactions of application 116 were logged, or in the process of being logged, according to workflow 200 at the time of the crash/failure.

At block 302, micro-journaling service 120 can identify the set of micro-journals in pool 122 that are still "in-flight" (i.e., have committed journal entries in byte-addressable persistent memory 110 but have not yet been freed). This set represents the transactions that were not fully completed at the time of the crash/failure, and thus may be in an inconsistent state. This set will include micro-journals that were committed per block 208 of FIG. 2, but were not freed per block 214 of FIG. 2 prior to the crash/failure.

At block 304, micro-journaling service 120 can replay the journal entries in the set of micro-journals identified at block 302, thereby applying (or re-applying) the data/metadata changes corresponding to those entries to the memory/storage on which the data/metadata resides. Recall that the journal entries are structured as idempotent entries. Thus, there is no adverse consequence for re-applying a data/metadata change that may be been previously applied.

Finally, at blocks 306 and 308, micro-journaling service 120 can commit the data/metadata changes (e.g., perform a pcommit if the data/metadata is stored on byte-addressable persistent memory 110) and free the micro-journals. Micro-journaling service 120 can perform the freeing operation at block 308 as an atomic operation (such as, e.g., atomically changing an "allocated" bit to "free"). After block 308, all of the data/metadata of transactional application 116 will be in a consistent state, and thus application 116 can be restarted to carry out its normal runtime operation.

5. Commit Coalescing

In scenarios where the data/metadata of transactional application 116 is maintained in byte-addressable persistent memory 110 (along with micro-journals 122), transaction processing workflow 200 of FIG. 2 is required to perform two pcommits per transaction—a "journal pcommit" to commit the journal entries to byte-addressable persistent memory 110 (at block 208), and a "data/metadata pcommit" to commit the data/metadata modifications to byte-addressable persistent memory 110 (at block 212). Unfortunately, pcommits incur a latency that is substantially higher than writes to persistent memory (or to DRAM). This because a pcommit typically involves at least two steps: (1) issuing the pcommit to a persistent memory controller, and (2) persisting all of the write data cached by the controller to the persistent memory medium (usually with some wear-leveling algorithm overhead). Step (1) alone can consume up to 150-200 CPU cycles, and step (2) is even more expensive. Thus, the need to perform two pcommits can significantly increase the latency for each transaction.

To address this, in certain embodiments micro-journaling service 120 can implement a "commit coalescing" mechanism to reduce the number of pcommits needed per transaction from two to one. This commit coalescing mechanism leverages the fact that a pcommit action commits all pending write data to the persistent memory medium, across all threads/processing cores. Thus, rather than performing the data/metadata pcommit to commit the data/metadata changes for a given transaction, micro-journaling service 120 can wait for a journal pcommit to occur for a later transaction (either running on the same processing core or a different processing core of the system). The subsequent journal pcommit will also commit the data/metadata changes for the earlier transaction, thereby effectively combining, or coalescing, the effect of the two pcommits into one.

5.a Transaction Processing Using Commit Coalescing

Figure 4:
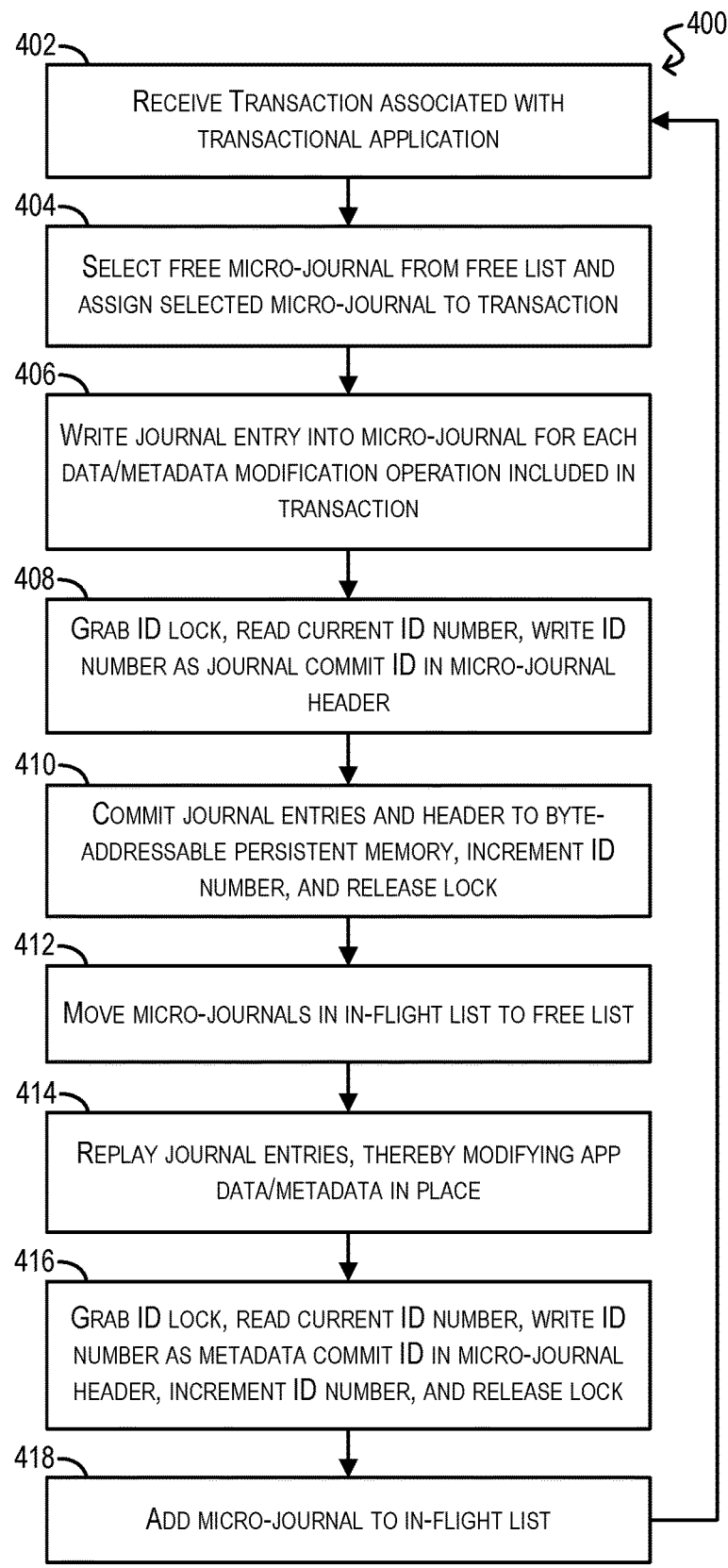
FIG. 4 depicts a micro-journal based transaction processing workflow using commit coalescing according to an embodiment.

FIG. 4 depicts a workflow 400 that can be carried out by micro-journaling service 120 of FIG. 1 for processing a transaction using commit coalescing according to an embodiment. Workflow 400 assumes that the following three data items are maintained in the volatile memory (i.e., DRAM 108) of computer system 100: (1) a globally ascending identifier (ID) with a lock guarding write access to the ID, (2) a list of free micro-journals in pool 122 that can be assigned to new transactions, and (3) a list of in-flight micro-journals that have been assigned but not yet freed. Workflow 400 also assumes there may be multiple transactions being processed at any given point in time (via, e.g., concurrent instances of service 120 running on respective processing cores 104(1)-104(N)).

At blocks 402, 404, and 406, micro-journaling service 120 can receive a transaction associated with transactional application 116, select a free micro-journal from the free-micro-journal list, assign the selected micro-journal to the transaction, and write a journal entry into the assigned micro-journal for each modification operation included in the transaction. These steps can be performed in a manner that is similar to blocks 202, 204, and 206 of workflow 200.

At block 408, micro-journaling service 120 can grab the lock on the ID in DRAM 108, read the current ID number, and write the ID number to a header of the micro-journal as a "journal commit ID." Micro-journaling service 120 can then issue a pcommit to commit the journal header and the written journal entries to byte-addressable persistent memory 110, increment the ID number in DRAM 108, and release the lock (block 410).

Once the lock is released, micro-journaling service 120 can move all micro-journals in the in-flight list to the free list (block 412). This because the journal pcommit performed at block 410 has also committed the data/metadata writes for any pending micro-journals to byte-addressable persistent memory 110, and thus those micro-journals are now free to be reused. Micro-journaling service 120 can perform the move operation at block 412 as an atomic operation.

After that, micro-journaling service 120 can replay the journal entries to modify the application data/metadata for the transaction in place (block 414). Service 120 can also grab the ID lock again, read the current ID number, write the ID number to the micro-journal header as a "metadata commit ID," increment the ID number in DRAM 108, and release the lock (block 416).

Finally, at block 418, micro-journaling service 120 can add the current micro-journal to the in-flight list and workflow 400 can return to block 402 in order to process additional transactions. Like the move operation at block 412, micro-journaling service can perform the adding of the current micro-journal to the in-flight list atomically. Note that the micro-journal is not moved to the free list at the end of this workflow since the data/metadata changes have not been explicitly committed; instead, the micro-journal will be moved to the free list when a subsequent journal pcommit is issued by the current micro-journaling service instance, or another service instance running on a different processing core of the system.

5.B Recovery Using Commit Coalescing

Figure 5A:
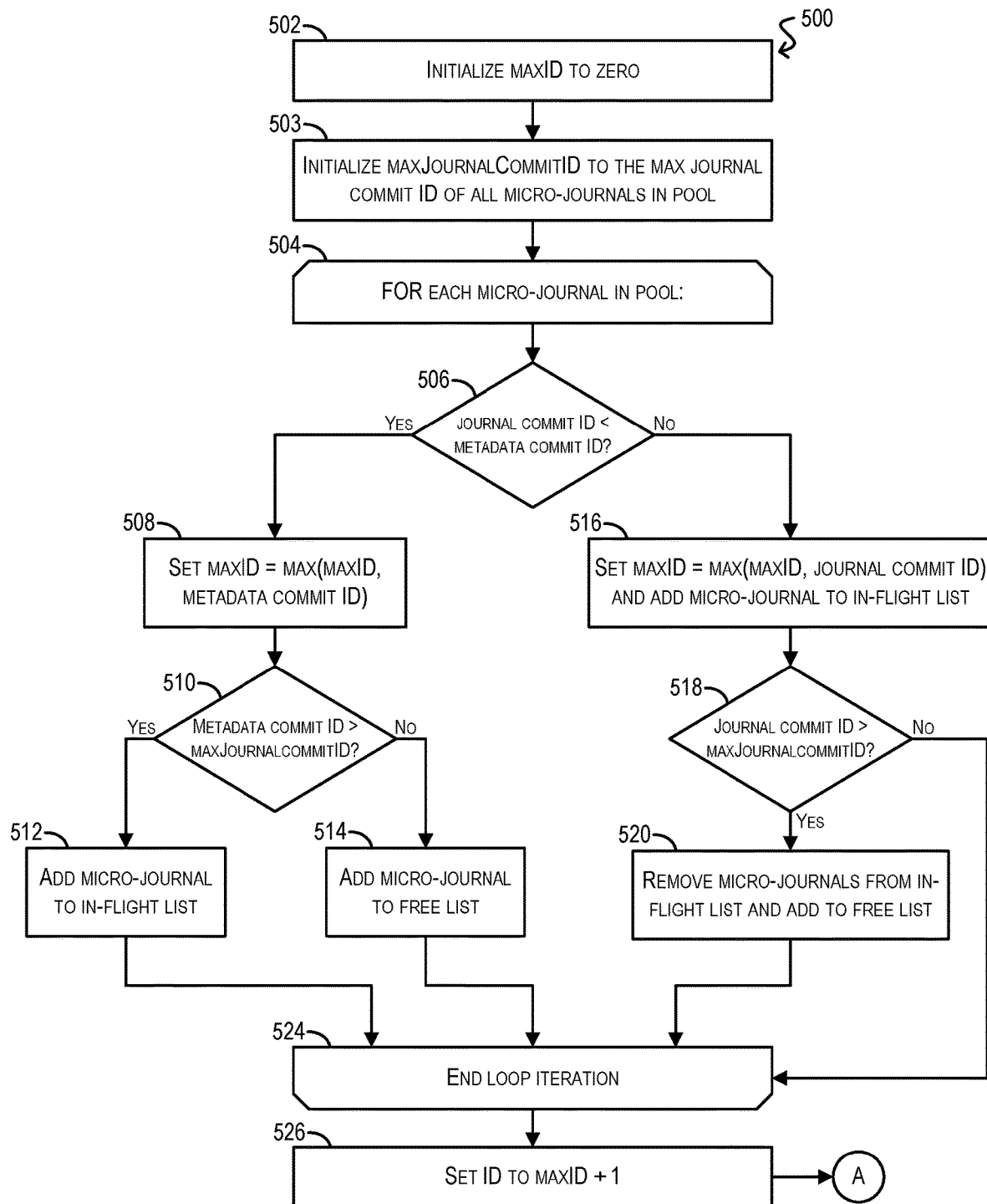
FIGS. 5A and 5B depict a recovery workflow associated with the workflow of FIG. 4 according to an embodiment.
Figure 5B:
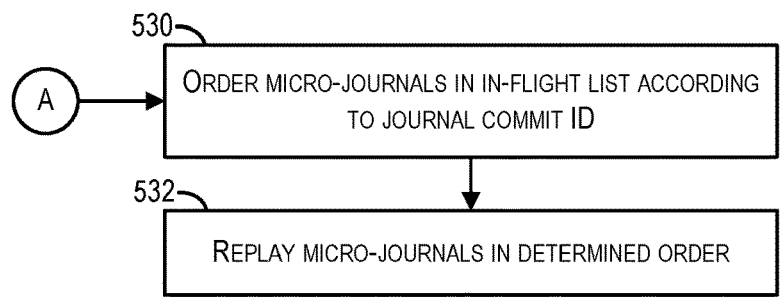

FIGS. 5A and 5B collectively depict a workflow 500 that may be carried out by micro-journaling service 120 of FIG. 1 for executing a recovery workflow in view of the commit coalescing performed in workflow 400 according to an embodiment. In particular, FIG. 5A depicts a sub-process for reconstructing the globally ascending ID, micro-journal free list, and micro-journal in-flight list in DRAM 108, and FIG. 5B depicts a sub-process for replaying necessary journal entries once those three data items are reconstructed.

Starting with FIG. 5A, micro-journaling service 120 can first initialize a variable referred to as "maxID" to zero (block 502). In addition, micro-journaling service 120 can initialize a variable referred to as "maxJournalCommitID" to the maximum journal commit ID of all of the micro-journals in pool 122 (block 503). Micro-journaling service 120 can then enter a loop for each micro-journal in pool 122 (block 504).

Within the loop, micro-journaling service 120 can check whether the journal commit ID for the current micro-journal is less than its metadata commit ID (block 506). If so, micro-journaling service 120 can set maxID to the greater of maxID or the metadata commit ID (block 508). In addition, micro-journaling service 120 can check whether the metadata commit ID is greater than maxJournalCommitID (block 510). If yes, micro-journaling service 120 can add the current micro-journal to the in-flight list (block 512). If no, micro-journaling service 120 can add the current micro-journal to the free list (block 514).

If the journal commit ID is not less than the metadata commit ID at block 506, micro-journaling service 120 can set maxID to the greater of maxID or the journal commit ID and can add the current micro-journal to the in-flight list (block 516). Micro-journaling service 120 can then check whether the journal commit ID is greater than maxJournalCommitID (block 518), and if so, can remove all micro-journals in the in-flight list that have a metadata commit ID less than the current journal commit ID and can add those removed micro-journals to the free list (block 520).

At the conclusion of the foregoing processing, the current loop iteration can end (block 524), and workflow 500 can return the start of the loop to process additional micro-journals in pool 122. Once all micro-journals have been processed, the globally ascending ID in DRAM 108 can be set to maxID+1 (block 526) and workflow 500 can turn to FIG. 5B. Alternatively, the globally ascending ID can be initialized to zero and block 526 can be omitted.

At block 530 of FIG. 5B, micro-journaling service 120 can order all of micro-journals in the in-flight list according to their respective journal commit IDs. Micro-journaling service 120 can then replay the micro-journals in this determined order (block 532). As part of block 532 micro-journaling service 120 can, for each micro-journal, grab the ID lock, read the current ID number, write the ID number to the micro-journal header as a "metadata commit ID," increment the ID number in DRAM 108, and release the lock in a manner similar to block 416 of workflow 400. In this example no pcommits are issued, so these micro-journals remain in the in-flight list. In an alternative embodiment, micro-journaling service 120 can issue a pcommit after replaying the micro-journals in the in-flight list and then move those micro-journals to the free list. Recovery is typically a rare situation (once per boot at worst), and thus the cost of a pcommit for all of the micro-journals that were in flight is relatively small.

After block 532, all of the data/metadata of transactional application 116 will be in a consistent state, and thus application 116 can be restarted to carry out its normal runtime operation.

5.C Simplified Transaction Processing for Serial Transactions

Figure 6:
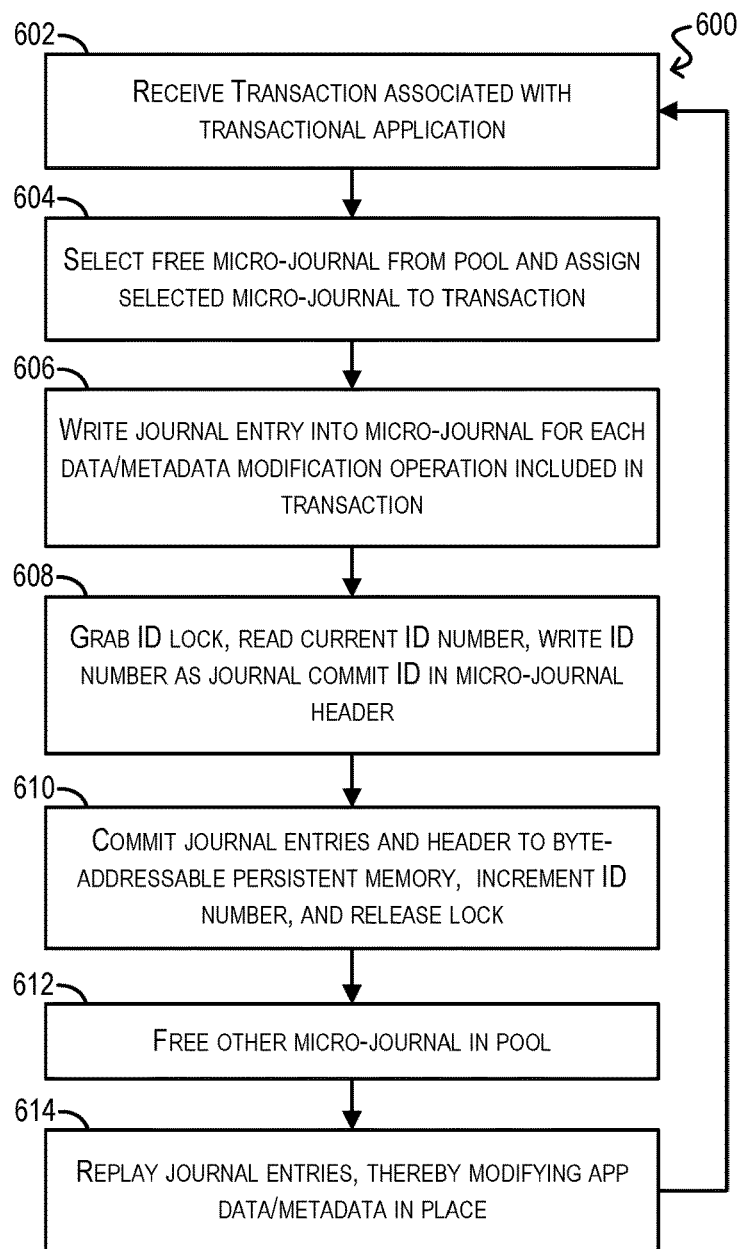
FIG. 6 depicts a simplified version of the workflow of FIG. 4 for serial transactions according to an embodiment.

As mentioned above, transaction processing workflow 400 of FIG. 4 assumes that there may be multiple concurrent transactions. However, some transactional applications, such as the Redis data store, are single-threaded and thus process transactions in a serial fashion. For these single-threaded applications, a simplified workflow can be used for implementing microjournal-based transaction logging with commit coalescing. An example of such a simplified workflow 600 is shown in FIG. 6 according to an embodiment. In workflow 600, exactly two micro-journals are allocated in pool 122. In addition, a globally ascending ID is maintained in DRAM 108.

At blocks 602, 604, and 606, micro-journaling service 120 can receive a transaction associated with transactional application 116, select a free micro-journal from pool 122, assign the selected micro-journal to the transaction, and write a journal entry into the assigned micro-journal for each modification operation included in the transaction.

At block 608, micro-journaling service 120 can grab the lock on the ID in DRAM 108, read the current ID number, and write the ID number to a header of the micro-journal as a journal commit ID. Micro-journaling service 120 can then issue a pcommit to commit the journal header and the written journal entries to byte-addressable persistent memory 110, increment the ID number in DRAM 108, and release the lock (block 610).

Once the lock is released, micro-journaling service 120 can free the other micro-journal in pool 122 if it is not already free (block 612) and can replay the journal entries to modify the application data/metadata for the transaction in place (block 614). Micro-journaling service 120 can then return to block 602 in order to process additional transactions. Note that that there is no need to maintain a separate "metadata commit ID" per micro-journal/transaction as in workflow 400; once a journal pcommit is issued with respect to one micro-journal, service 120 knows that the data/metadata changes for the other micro-journal are also committed, and thus the other micro-journal can be automatically freed for use.

For this simplified approach, the recovery process is straightforward—micro-journaling service 120 identifies the micro-journal with the higher journal commit ID and replays the journal entries in that micro-journal. There is no need to take any action with respect to the other micro-journal, because it is either an uncommitted journal or journal whose data/metadata changes have already been committed.

5.D Handling ID Overflow

One potential problem with the various commit coalescing workflows described above is that the globally ascending ID maintained in DRAM 108 can overflow, which in turn can break the workflows. One way for this avoiding this problem is to simply use a variable size that is large enough to ensure that overflow will not occur within the practical lifetime of the system, such as a 64-bit variable.

Figure 7:
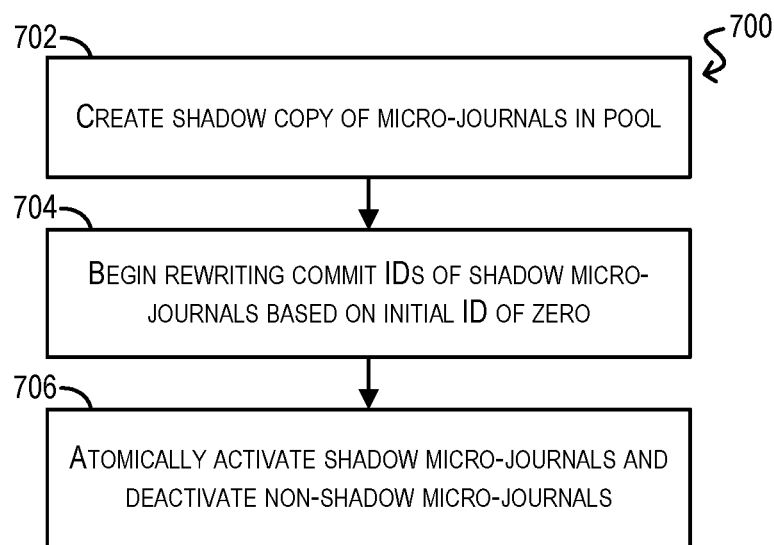
FIG. 7 depicts a workflow for handling ID overflow according to an embodiment.

Another solution is to implement an ID reset process 700 as shown in FIG. 7 according to an embodiment. At blocks 702 and 704, micro-journaling service 120 can create a shadow copy of the micro-journals in pool 122 during the application 116's normal runtime operation and can begin re-writing the commit IDs in the shadow micro-journals based on an initial ID of zero (or some other initial value).

Once all of the commit IDs have been rewritten, micro-journaling service 120 can atomically activate the shadow micro-journals and deactivate the non-shadow micro-journals, thereby completing the reset process (block 706). Or alternatively, service 120 can use a special "reset" journal (which does not require a commit ID) to record all of the commit IDs to be rewritten and thus guarantee crash consistency of the reset process.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for using commit coalescing when performing micro-journal-based transaction logging, the method comprising:
   maintaining, by a computer system in a volatile memory, a globally ascending identifier and a first list of free micro-journals, each micro-journal in the first list being stored in a byte-addressable persistent memory of the computer system and being configured to record journal entries for a single transaction at a time;
   receiving, by the computer system, a transaction comprising one or more modifications to data or metadata stored in the byte-addressable persistent memory;
   selecting, by the computer system, a micro-journal from the first list;
   obtaining a lock on the globally ascending identifier and writing a current value of the globally ascending identifier as a journal commit identifier into the micro-journal;
   writing, by the computer system, journal entries into the micro-journal corresponding to the one or more modifications included in the transaction; and
   committing, by the computer system, the micro-journal to the byte-addressable persistent memory.

2. The method of claim 1 further comprising:
   incrementing the current value of the globally ascending identifier and releasing the lock.

3. The method of claim 2 wherein the computer system further maintains a second list of in-flight micro-journals in the volatile memory, and wherein the method further comprises:
   moving micro-journals in the second list to the first list;
   writing the one or more modifications included in the transaction, without committing the one or more modifications to the byte-addressable persistent memory;
   obtaining the lock on the globally ascending identifier and writing a current value of the globally ascending identifier as a metadata commit identifier in the header;
   incrementing the current value of the globally ascending identifier and releasing the lock; and
   adding the micro-journal to the second list.

4. The method of claim 3 further comprising, after a crash or failure of the computer system:
   reconstructing the globally ascending identifier, the first list of free micro-journals, and the second list of in-flight micro-journals;
   ordering micro-journals in the second list according to their respective journal commit identifiers; and
   replaying the micro-journals in the second list in order.

5. The method of claim 4 wherein reconstructing the globally ascending identifier, the first list of free micro-journals, and the second list of in-flight micro-journals comprises:
   initializing a first variable to zero;
   initializing a second variable to the largest journal commit identifier of all micro-journals; and
   for each micro-journal:
     if the journal commit identifier is less than the metadata commit identifier:
       setting the first variable to the greater of the first variable and the metadata commit identifier; and
       if the metadata commit identifier is greater than the second variable:
         adding the micro-journal to the second list;
       else:
         adding the micro-journal to the first list;
     else:
       setting the first variable to the greater of the first variable and the journal commit identifier;
       adding the micro-journal to the second list; and
       if the journal commit identifier is greater than the second variable, removing all micro-journals from the second list and adding the removed micro-journals to the first list.

6. The method of claim 5 wherein reconstructing the globally ascending identifier, the first list of free micro-journals, and the second list of in-flight micro-journals further comprises:
   setting the globally ascending identifier to the first variable plus 1.

7. The method of claim 3 further comprising, prior to an overflow of the globally ascending identifier:
creating shadow copies of the micro-journals stored in the byte-addressable persistent memory;
rewriting the journal commit identifiers and the metadata commit identifiers included in the shadow copies based on a new initial value; and
atomically activating the shadow copies of the micro-journals and deactivating the original microjournals.

8. A non-transitory computer readable storage medium having stored thereon program code executable by a computer system, the program code embodying a method for using commit coalescing when performing micro-journal-based transaction logging, the method comprising:
maintaining, in a volatile memory of the computer system, a globally ascending identifier and a first list of free micro-journals, each micro-journal in the first list being stored in a byte-addressable persistent memory of the computer system and being configured to record journal entries for a single transaction at a time;
receiving a transaction comprising one or more modifications to data or metadata stored in the byte-addressable persistent memory;
selecting a micro-journal from the first list;
obtaining a lock on the globally ascending identifier and writing a current value of the globally ascending identifier as a journal commit identifier into the micro-journal;
writing journal entries into the micro-journal corresponding to the one or more modifications included in the transaction; and
committing the micro-journal to the byte-addressable persistent memory.

9. The non-transitory computer readable storage medium of claim 8 wherein the method further comprises:
incrementing the current value of the globally ascending identifier and releasing the lock.

10. The non-transitory computer readable storage medium of claim 9 wherein the computer system further maintains a second list of in-flight micro-journals in the volatile memory, and wherein the method further comprises:
moving micro-journals in the second list to the first list;
writing the one or more modifications included in the transaction, without committing the one or more modifications to the byte-addressable persistent memory;
obtaining the lock on the globally ascending identifier and writing a current value of the globally ascending identifier as a metadata commit identifier in the header;
incrementing the current value of the globally ascending identifier and releasing the lock; and
adding the micro-journal to the second list.

11. The non-transitory computer readable storage medium of claim 10 wherein the method further comprises, after a crash or failure of the computer system:
reconstructing the globally ascending identifier, the first list of free micro-journals, and the second list of in-flight micro-journals;
ordering micro-journals in the second list according to their respective journal commit identifiers; and
replaying the micro-journals in the second list in order.

12. The non-transitory computer readable storage medium of claim 11 wherein reconstructing the globally ascending identifier, the first list of free micro-journals, and the second list of in-flight micro-journals comprises:
initializing a first variable to zero;
initializing a second variable to the largest journal commit identifier of all micro-journals; and
for each micro-journal:
if the journal commit identifier is less than the metadata commit identifier:
setting the first variable to the greater of the first variable and the metadata commit identifier; and
if the metadata commit identifier is greater than the second variable:
adding the micro-journal to the second list;
else:
adding the micro-journal to the first list;
else:
setting the first variable to the greater of the first variable and the journal commit identifier;
adding the micro-journal to the second list; and
if the journal commit identifier is greater than the second variable, removing all micro-journals from the second list and adding the removed micro-journals to the first list.

13. The non-transitory computer readable storage medium of claim 12 wherein reconstructing the globally ascending identifier, the first list of free micro-journals, and the second list of in-flight micro-journals further comprises:
setting the globally ascending identifier to the first variable plus 1.

14. The non-transitory computer readable storage medium of claim 10 wherein the method further comprises, prior to an overflow of the globally ascending identifier:
creating shadow copies of the micro-journals stored in the byte-addressable persistent memory;
rewriting the journal commit identifiers and the metadata commit identifiers included in the shadow copies based on a new initial value; and
atomically activating the shadow copies of the micro-journals and deactivating the original microjournals.

15. A computer system comprising:
a processor;
a volatile memory;
a byte-addressable persistent memory; and
a non-transitory computer readable medium having stored thereon program code for implementing commit coalescing when performing micro-journal-based transaction logging, the program code causing the processor to:
maintain, in the volatile memory, a globally ascending identifier and a first list of free micro-journals, each micro-journal in the first list being stored in the byte-addressable persistent memory and being configured to record journal entries for a single transaction at a time;
receive a transaction comprising one or more modifications to data or metadata stored in the byte-addressable persistent memory;
select a micro-journal from the first list;
obtain a lock on the globally ascending identifier and write a current value of the globally ascending identifier as a journal commit identifier into the micro-journal;
write journal entries into the micro-journal corresponding to the one or more modifications included in the transaction; and
commit the micro-journal to the byte-addressable persistent memory.

16. The computer system of claim 15 wherein the program code further causes the processor to:
increment the current value of the globally ascending identifier and release the lock.

17. The computer system of claim 16 wherein the processor further maintains a second list of in-flight micro-journals in the volatile memory, and wherein the program code further causes the processor to:
- move micro-journals in the second list to the first list;
- write the one or more modifications included in the transaction, without committing the one or more modifications to the byte-addressable persistent memory;
- obtain the lock on the globally ascending identifier and writing a current value of the globally ascending identifier as a metadata commit identifier in the header;
- increment the current value of the globally ascending identifier and release the lock; and
- add the micro-journal to the second list.

18. The computer system of claim 17 wherein the program code further causes the processor to, after a crash or failure of the computer system:
- reconstruct the globally ascending identifier, the first list of free micro-journals, and the second list of in-flight micro-journals;
- order micro-journals in the second list according to their respective journal commit identifiers; and
- replay the micro-journals in the second list in order.

19. The computer system of claim 18 wherein reconstructing the globally ascending identifier, the first list of free micro-journals, and the second list of in-flight micro-journals comprises:
- initializing a first variable to zero;
- initializing a second variable to the largest journal commit identifier of all micro-journals; and
- for each micro-journal:
  - if the journal commit identifier is less than the metadata commit identifier:
    - setting the first variable to the greater of the first variable and the metadata commit identifier; and
    - if the metadata commit identifier is greater than the second variable:
      - adding the micro-journal to the second list;
    - else:
      - adding the micro-journal to the first list;
  - else:
    - setting the first variable to the greater of the first variable and the journal commit identifier;
    - adding the micro-journal to the second list; and
    - if the journal commit identifier is greater than the second variable, removing all micro-journals from the second list and adding the removed micro-journals to the first list.

20. The computer system of claim 19 wherein reconstructing the globally ascending identifier, the first list of free micro-journals, and the second list of in-flight micro-journals further comprises:
- setting the globally ascending identifier to the first variable plus 1.

21. The computer system of claim 17 wherein the program code further causes the processor to, prior to an overflow of the globally ascending identifier:
- create shadow copies of the micro-journals stored in the byte-addressable persistent memory;
- rewrite the journal commit identifiers and the metadata commit identifiers included in the shadow copies based on a new initial value; and
- atomically activate the shadow copies of the micro-journals and deactivate the original microjournals.

* * * * *